United States Patent
Aboshi et al.

(10) Patent No.: US 8,412,041 B2
(45) Date of Patent: *Apr. 2, 2013

(54) SUBSCRIBER PREMISES SIDE OPTICAL NETWORK UNIT AND OPTICAL TRANSMISSION SYSTEM

(75) Inventors: Katsuya Aboshi, Tokyo (JP); Kunio Odaka, Tokyo (JP); Kazutaka Shimoosako, Tokyo (JP)

(73) Assignee: Furukawa Electric Co., Ltd, Tokyo (JP)

( * ) Notice: Subject to any disclaimer, the term of this patent is extended or adjusted under 35 U.S.C. 154(b) by 502 days.

This patent is subject to a terminal disclaimer.

(21) Appl. No.: 12/429,696

(22) Filed: Apr. 24, 2009

(65) Prior Publication Data

US 2010/0106437 A1    Apr. 29, 2010

(51) Int. Cl.
*H04J 14/00*   (2006.01)
(52) U.S. Cl. .......................................... 398/66
(58) Field of Classification Search ............ 702/63, 702/118; 324/430; 320/132; 398/63, 66; 370/249, 463

See application file for complete search history.

(56) References Cited

U.S. PATENT DOCUMENTS 8,059,961 B2 * 11/2011 Shimoosako et al. .......... 398/66
2008/0243405 A1 * 10/2008 Iwane .............................. 702/63

FOREIGN PATENT DOCUMENTS

JP    9214541    8/1997

* cited by examiner

*Primary Examiner* — Bryan Bui
(74) *Attorney, Agent, or Firm* — Turocy & Watson, LLP

(57) ABSTRACT

A subscriber premises side optical network unit, and an optical transmission system having the same, is provided that monitors whether or not a communication condition is established with a center side optical line termination and halts signals to be outputted to external nodes when the communication condition is not established. In an optical network unit (ONU), a signal output control means monitors whether or not the communication condition with an OLT is established and when it determines that the communication condition is not established, outputs an output halting request to loopback setting sections to control to assume a loopback state. Thereby, it becomes possible to halt the output of the signals from an interface module to a switch.

17 Claims, 7 Drawing Sheets ized signals are exchanged between the serial/parallel converting means and the multi-source agreement interface module.

SUBSCRIBER PREMISES SIDE OPTICAL NETWORK UNIT AND OPTICAL TRANSMISSION SYSTEM

CROSS-REFERENCE TO RELATED APPLICATIONS

This application claims priority from a Japanese patent application serial No. 2007-279332, filed on Oct. 26, 2008, the entire content of which is incorporated herein by reference.

BACKGROUND OF THE INVENTION

1. Field of the Invention

The present invention relates to a subscriber premises side optical network unit and an optical transmission system and more specifically to an optical network unit installed at a subscriber premises side terminal of an optical transmission path and the optical transmission system having the same.

2. Description of Related Art

A PON (Passive Optical Network) type optical transmission system that branches an optical transmission path connected to a center by a passive type splitter to lay the paths to a plurality of subscriber premises is used in an optical network such as FTTH and CATV as described in Japanese Patent Application Laid-open No. Hei. 9-214541 for example. This sort of optical transmission system is called also as PDS (Passive Double Star).

As shown in FIG. 9, a splitter 903 is connected to an optical fiber 902 led from an OLT (Optical Line Termination) 901 of a center to the side of users and subscriber premises ONUs (Optical Network Unit) 905-1 through 905-n are connected to a plurality of optical transmission paths branched by the splitter 903 through optical fibers 904-1 through 904-n in the PON-type optical transmission system.

FIG. 10 shows a structure of the ONU 905-1 as one example of the ONUs 905-1 through 905-n. The ONU 905-1 includes an optical transceiver section 906, an ONU functioning section 907 and Ethernet (registered mark) interface 908 and is installed in premises of each subscriber. The optical transceiver section 906 is connected with the optical fiber 904-1 led into the premises from the outdoor for example through an optical termination unit 909.

As the Ethernet (registered trademark) interface 908, 10/100/1000 BASE-TX and the like may be used and a LAN cable 910 for example may be connected to the interface. Terminal units 914 such as a computer and a printer may be directly connected to the LAN cable 910. Or, a switch such as a router 912 and a switching hub 913 may be connected to the LAN cable 910 and other terminal units 914 may be connected to the switch.

In order to enable the terminal units, switch and others (referred to as external nodes hereinafter) connected to the ONU to communicate with the center through the ONU, a process for enabling the communication between the center side OLT and the subscriber premises side ONU is made at first and then a process for starting the communication between the ONU and the external node is made. An auto-negotiation function is provided respectively in a MAC (media Access Control) section within the ONU and in a MAC section of the external node in order to carry out the process for starting the communication between the ONU and the external node.

However, when some kind of signal, e.g., a signal for carrying out the auto-negotiation, is outputted out of the ONU to the external node before the communication is enabled between the center side OLT and the subscriber premises ONU, the external node starts a predetermined process by receiving the signal from the ONU and outputs data related to the auto-negotiation for example to the ONU. As a result, there is a possibility that the ONU executes an error handling process, thus disabling to start the communication.

Still more, it is necessary to quickly halt transmission of signals between the ONU and the external node when the communication between the OLT and the ONU is disallowed by some reason after when the communication between the external node and the center through the ONU is enabled. If the ONU outputs signals to the external node even after when the communication between the OLT and the ONU is disabled, the external node determines that the communication is enabled and continuously and normally outputs signals to the ONU. As a result, there is also a possibility that the ONU executes the error handling process, thus disabling to restart the communication.

Accordingly, the invention is made to solve these problems and seeks to provide a subscriber premises side optical network unit, and an optical transmission system having the same, that monitors whether or not a communication condition with the center side optical line termination is established and halts signals to be outputted to the external node when the communication condition is not established.

SUMMARY OF THE INVENTION

According to a first aspect of a subscriber premises side optical network unit of the invention, the subscriber premises side optical network unit includes an electrical/optical converting means connected to a center side optical transmission path to carry out photoelectric conversion and reverse photoelectric conversion, an optical network unit functioning section connected to electrical signal input/output ends of the electrical/optical converting means, a serial/parallel converting means connected to parallel signal ends of the optical network unit functioning section to carry out serial/parallel conversion and reverse serial/parallel conversion and a multi-source agreement interface module connected to serial signal ends of the serial/parallel converting means. The optical network unit functioning section has a signal output control means that halts a down signal from being outputted from the multi-source agreement interface module to external nodes until when it determines that a communication condition with the center is established, i.e., whether or not a PON link with the center is established or authentication is established.

According to a second aspect of the subscriber premises side optical network unit of the invention, the serial/parallel converting means has an output halting means for halting the down signal from being outputted to the multi-source agreement interface module in accordance to the predetermined output halting request and the signal output control means outputs the output halting request to the output halting means until when it determines that the communication condition is established.

According to a third aspect of the subscriber premises side optical network unit of the invention, the signal output control means halts to process the down signal in the optical network unit functioning section until when it determines that the communication condition is established.

According to a fourth aspect of the subscriber premises side optical network unit of the invention, the multi-source agreement interface module is a module of either GBIC or SFP.

According to a fifth aspect of the subscriber premises side optical network unit of the invention, both input and output signals of parallel signals transmitted between the optical network unit functioning section and the serial/parallel converting means are composed of 10 bits.

According to a sixth aspect of the subscriber premises side optical network unit of the invention, the output halting means controls to assume a loopback state of returning the signal received from the optical network unit functioning section to the optical network unit functioning section when it receives the output halting request from the signal output control means and releases the loopback state when it receives no output halting request.

According to one aspect of an optical transmission system of the invention, the optical transmission system includes the subscriber premises side optical network unit as described in any one of the first through sixth aspects of the invention, an optical multiplexing synthesizing/branching section having subscriber premises side ports connected to the subscriber premises side optical network unit through first optical transmission paths, a second optical transmission paths connected to center side ports of the optical multiplexing synthesizing/branching section and a center side optical line termination connected to the second optical transmission paths.

According to another aspect of the optical transmission system of the invention, the multi-source agreement interface module of the subscriber premises side optical network unit is directly connected to a multi-source agreement interface slot of the external node.

According to a still other aspect of the optical transmission system of the invention, the external node is a switch having a plurality of ports.

According to seventh aspect of a subscriber premises side optical network unit of the invention, the subscriber premises side optical network unit includes an electrical/optical converting means connected to a center side optical transmission path to carry out photoelectric conversion and reverse photoelectric conversion, an optical network unit functioning section connected to electrical signal input/output ends of the electrical/optical converting means, a serial/parallel converting means connected to parallel signal ends of the optical network unit functioning section to carry out serial/parallel conversion and reverse serial/parallel conversion and an interface module connected to serial signal ends of the serial/parallel converting means. The optical network unit functioning section has a signal output control means that stops a down signal from being outputted from the interface module to external nodes until when it determines that a communication condition with the center is established, i.e., whether or not a PON link with the center is established or authentication is established.

According to an eighth aspect of the subscriber premises side optical network unit of the invention, the serial/parallel converting means has an output halting means for halting the down signal from being outputted to the interface module in accordance to the predetermined output halting request and the signal output control means outputs the output halting request to the output halting means until when it determines that the communication condition is established.

According to a ninth aspect of the optical transmission system of the invention, the signal output control means halts to process the down signal in the optical network unit functioning section until when it determines that the communication condition is established.

According to a tenth aspect of the optical transmission system of the invention, both input and output signals of parallel signals transmitted between the optical network unit functioning section and the serial/parallel converting means are composed of 10 bits.

According to an eleventh aspect of the optical transmission system of the invention, the output halting means controls to assume a loopback state of returning the signal received from the optical network unit functioning section to the optical network unit functioning section when it receives the output halting request from the signal output control means and releases the loopback state when it receives no output halting request.

According to another aspect of an optical transmission system of the invention, the optical transmission system includes the subscriber premises side optical network unit as described in any one of the seventh through eleventh aspects of the invention, an optical multiplexing synthesizing/branching section having subscriber premises side ports connected to the subscriber premises side optical network unit through first optical transmission paths, a second optical transmission paths connected to center side ports of the optical multiplexing synthesizing/branching section; and a center side optical line termination connected to the second optical transmission paths.

According to another aspect of the optical transmission system of the invention, the interface module of the subscriber premises side optical network unit is directly connected to an interface slot of the external node.

According to a still other aspect of the optical transmission system of the invention, the external node is a switch having a plurality of ports.

According to the invention described above, it is possible to provide the subscriber premises side optical network unit, and the optical transmission system having the same, that monitors whether or not the communication condition is established with the center side optical line termination and halts signals to be outputted to the external node when the communication condition is not established.

BEST MODE FOR CARRYING OUT THE INVENTION

Figure 1:
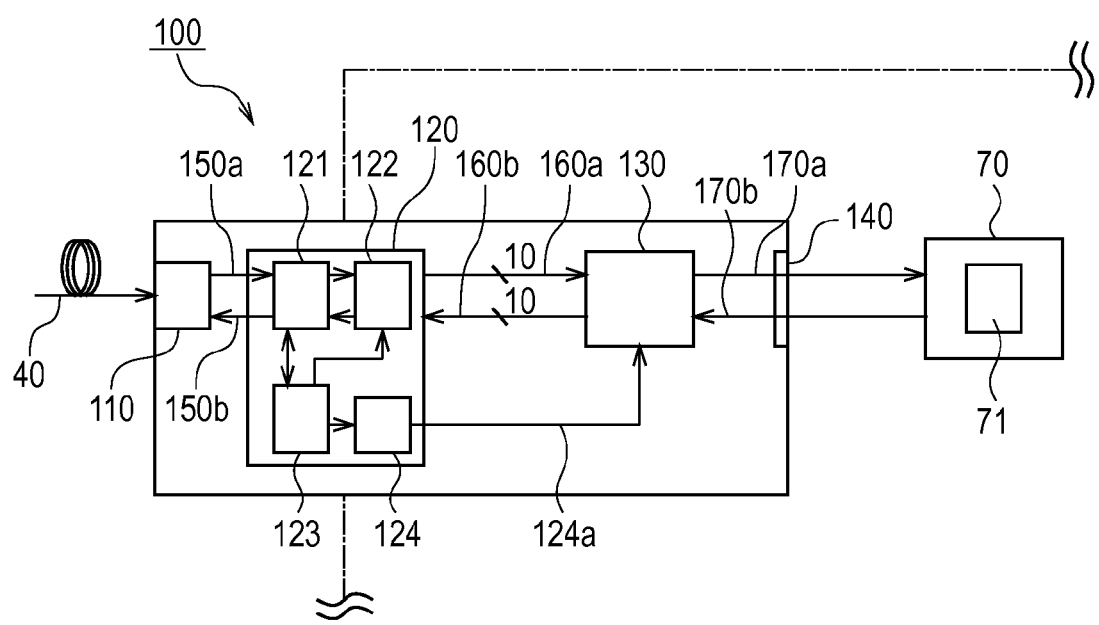
FIG. 1 is a block diagram showing a schematic structure of a subscriber premises side optical network unit according to an embodiment of the invention.
Figure 2:
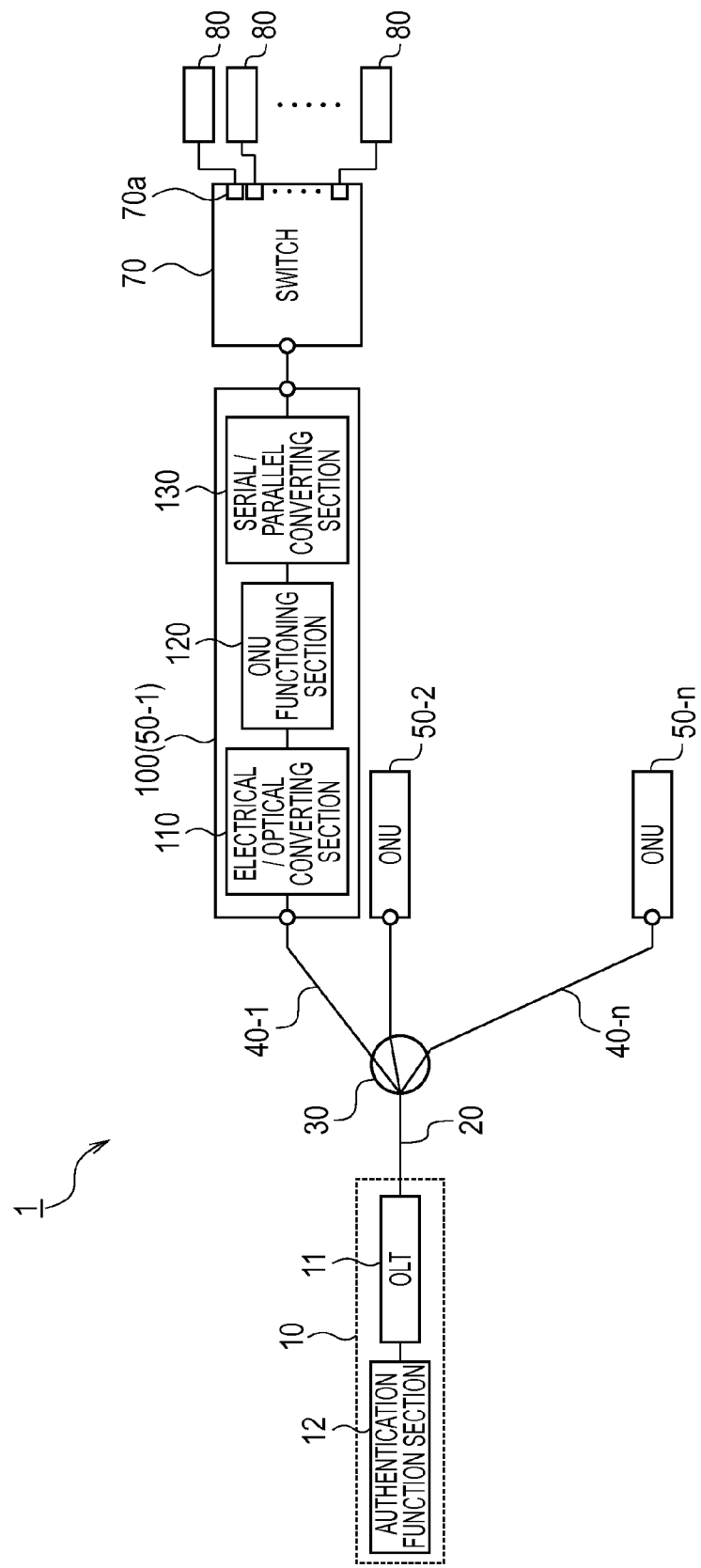
FIG. 2 is a block diagram showing a schematic structure of an optical transmission system according to the embodiment of the invention.

A structure of a subscriber premises side optical network unit (ONU) and an optical transmission system of a preferred embodiment of the invention will be explained in detail below with reference to the drawings. FIGS. 1 and 2 are block diagrams showing a schematic structure of the subscriber premises side optical network unit and an optical transmission system of the embodiment of the invention.

In the optical transmission system 1 shown in FIG. 2, a PON interface card 10 provided in a center has an optical line termination (OLT) 11 and an authentication functioning section 12 and one end of an optical fiber 20, i.e., an optical transmission path, is connected to an optical input/output ends of the OLT 11. An optical coupler (optical multiplexing synthesizing branching section) 30 is connected to another end, i.e., on the side of subscriber premises, of the optical fiber 20. The optical coupler 30 branches one optical transmission path of the optical fiber 20 into a plurality of optical transmission paths of optical fibers 40-1 through 40-n (n: natural number, hereinafter denoted as 40-1 through 40-n) and ONUs 50-1 through 50-n are connected respectively to the optical fibers 40-1 through 40-n.

The ONUs 50-1 through 50-n are installed in the subscriber premises, respectively, and external nodes such as a personal computer, a switch and others are connected to the ONU. In FIG. 2, the ONU 50-1 is connected with a switch 70 and a plurality of terminal units 80 is connected to a plurality of ports 70a provided in the switch 70. L2 and L3 switches and a router may be used for the switch 70.

It is noted that devices meeting regulations of GPON (abbreviation of Gigabit Passive Optical Network that is a system conforming to the ITU Standard G.984.x) and GEPON (abbreviation of Gigabit Ethernet (registered trademark) PON that is a system conforming to the IEEE 802.3ah Standard) are used for the OLT 11 and the ONUs 50-1 through 50-n.

An ONU 100 of the present embodiment is used for the ONUs 50-1 through 50-n connected to the optical transmission system 1 shown in FIG. 2. The embodiment using the ONU 100 as the ONU 50-1 as one example will be explained below. As shown in FIG. 1, the ONU 100 has an electrical/optical converting section 110 having an optical input/output ends to connect with the center side OLT 11 via an optical fiber 40. Still more, the ONU 100 has an interface module 140 to connect a serial/parallel converting section 130 with the external node (the switch 70 here) with serial electrical signals.

The switch 70 is connected with the interface module 140 and has a plurality of ports 70a provided to connect with terminal units 80. Thus, the plurality of terminal units 80 is connected to the center OLT 11 via the ONU 100 in this framework. A MSA (Multi-Source Agreement) interface module adapted to a standard directly connectable to a MSA interface slot provided in the switch 70 may be used for the interface module 140. There exist such modules as GBIC, SFP and others as the MSA interface module.

The ONU 100 has also an optical network unit functioning section (ONU functioning section) 120 that carries out a termination process and others in addition to the electrical/optical converting section 110, the serial/parallel converting section 130 and the interface module 140 described above. The ONU functioning section 120 is connected with the electrical/optical converting section 110 through first serial transmission paths 150a (down signal line) and 150b (up signal line) that transmit serial electrical signals and with the serial/parallel converting section 130 through parallel transmission paths 160a (down signal line) and 160b (up signal line) that transmit parallel electrical signals. The serial/parallel converting section 130 is connected with the interface module 140 through second serial transmission paths 170a (down signal line) and 170b (up signal line) that transmit serial electrical signals.

The electrical/optical converting section 110 converts optical signals transmitted from the OLT 11 of the center into electrical signals (photoelectric conversion) and outputs the electrical signals to the ONU functioning section 120 through the first serial transmission path 150a, i.e., the down signal line. The electrical/optical converting section 110 also converts electrical signals inputted from the ONU functioning section 120 through the first serial transmission path 150b, i.e., the up signal line, into optical signals (reverse photoelectric conversion) and transmits the optical signals to the OLT 11.

The ONU functioning section 120 converts serial signals inputted from the electrical/optical converting section 110 into parallel signals and after implementing a predetermined termination process, outputs the signals to the serial/parallel converting section 130 through the parallel transmission path 160a, i.e., the down signal line. The ONU functioning section 120 also converts parallel signals inputted from the serial/parallel converting section 130 through the parallel transmission path 160b, i.e., the up signal line, into serial signals and after implementing predetermined a termination process, outputs the signal to the electrical/optical converting section 110. The parallel signals transmitted between the ONU functioning section 120 and the serial/parallel converting section 130 may be signals of 10 bits for example.

The serial/parallel converting section 130 converts the parallel signals inputted from the ONU functioning section 120 into serial signals and outputs the signals to the switch 70 through the second serial transmission path 170a, i.e., the down signal line, and the interface module 140. The serial/parallel converting section 130 also converts serial signals inputted from the switch 70 through the second serial transmission path 170b, i.e., the up signal line, and the interface module 140 into parallel signals and outputs the signals to the ONU functioning section 120.

Figure 3:
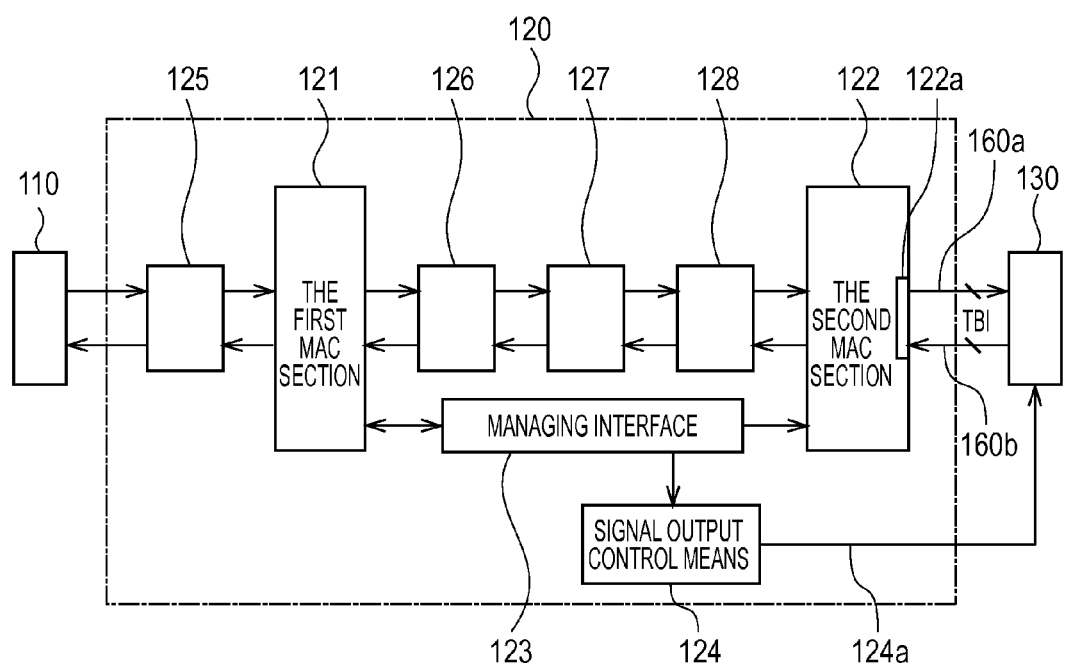
FIG. 3 is a block diagram showing a structure of a functioning section of the optical network unit according to the embodiment of the invention.

The ONU functioning section 120 has two MAC (Media Access Control) sections, i.e., a first MAC section 121 and a second MAC section 122, a managing interface 123 and a signal output control means 124. The first and second MAC sections 121 and 122 perform media access control conforming to IEEE 802.3ah. FIG. 3 shows a detailed structure of the ONU functioning section 120.

In the ONU functioning section 120 shown in FIG. 3, the first MAC section 121 is connected with electrical signal ends of the electrical/optical converting section 110 through a Gigabit serializer/deserializer (Gigabit SERDES) 125. The first MAC section 121 is also connected with the second MAC section 122 through an EPON (Ethernet (registered trademark) Passive Optical Network) lookup engine 126, a switch 127 and a Gigabit Ethernet (registered trademark) lookup engine 128.

The managing interface 123 connected with the first MAC section 121 performs a predetermined procedure for establishing communication with the OLT 11 through the electrical/optical converting section 110, the Gigabit serializer/deserializer 125 and the first MAC section 121.

The second MAC section 122 may be constructed to have a MAC function of 10 Mbps, 100 Mbps and 1 Gbps Ethernet (registered trademark) and a 10 bit interface (TBI) 122a as a parallel interface. The TBI section 122a is connected with the serial/parallel converting section 130 through ten down signal lines 160a and ten up signal lines 160b.

The first MAC section 121 performs MAC processes related to the communication with the OLT 11 of the center and the second MAC section 122 performs MAC processes related to the communication with the switch 70. FIG. 1 shows only the first MAC section 121, the second MAC section 122, the managing interface 123 and the signal output control means 124 by simplifying the detail structure of the ONU functioning section 120 shown as one example in FIG. 3.

Figure 4:
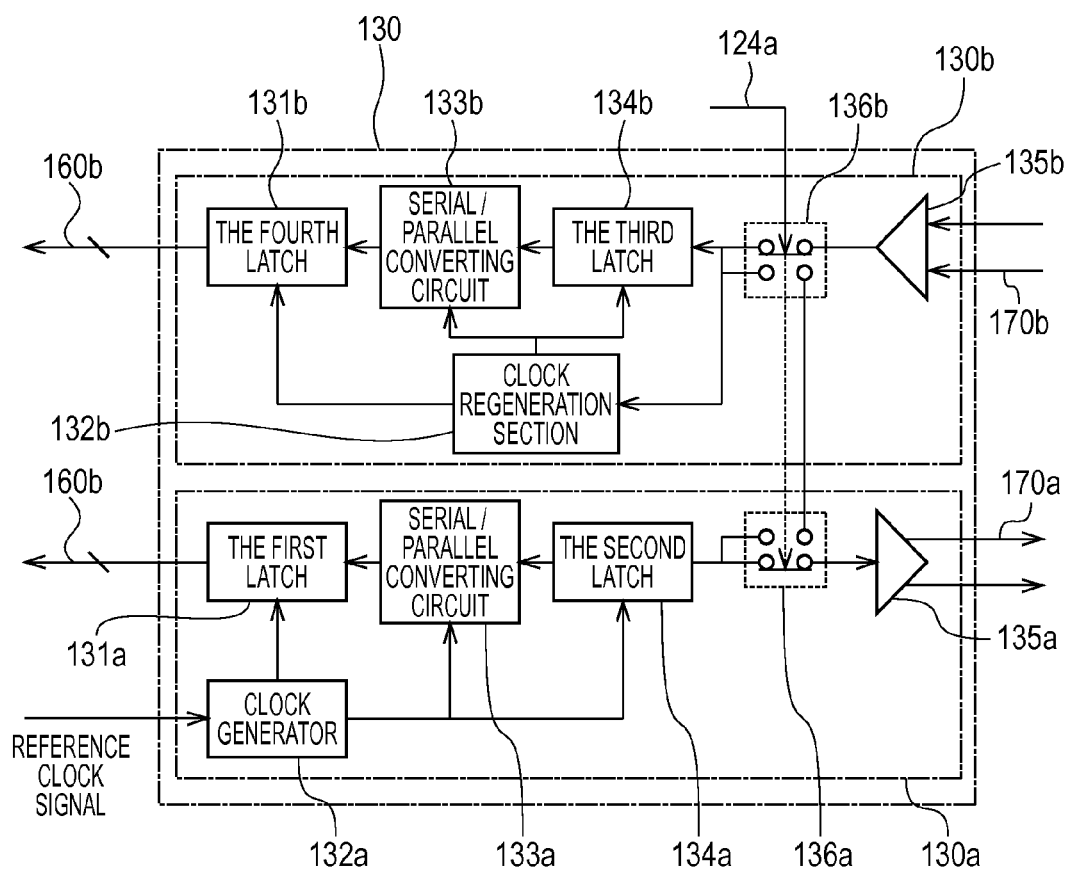
FIG. 4 is a block diagram showing a structure of a serial/parallel converting section according to the embodiment of the invention.

FIG. 4 shows one exemplary detailed structure of the serial/parallel converting section 130. The serial/parallel converting section 130 has an reverse serial/parallel converting section 130a that converts the parallel signals inputted from the ONU functioning section 120 into serial signals and outputs the signals to the interface module 140 and a serial/parallel converting section 130b that converts serial signals inputted from the interface module 140 into parallel signals and outputs the signals to the ONU functioning section 120.

The reverse serial/parallel converting section 130a has a first latch 131a that receives the parallel signals from the TBI section 122a of the ONU functioning section 120 and temporally holds the signals, a first serial/parallel converting circuit 133a that converts the parallel signals held by the first latch 131a into serial signals in synchronism with a reference clock signal outputted out of a clock generator 132a and outputs the signals, a second latch 134a that temporally holds the serial signals outputted out of the first serial/parallel converting circuit 133a and a branching section 135a that branches the serial signals outputted out of the second latch 134a in synchronism with the reference clock into two signals and outputs them to the interface module 140.

The serial/parallel converting section 130b has a synthesizing section 135b that receives the serial signals outputted out of the interface module 140, a clock regenerating section 132b that regenerates the clock based on the signals outputted out of the synthesizing section 135b, a third latch 134b that temporally holds the serial signals outputted out of the synthesizing section 135b and outputs the serial signals in synchronism with the clock signal of the clock regenerating section 132b, a second serial/parallel converting circuit 133b that converts the serial signals outputted out of the third latch 134b into parallel signals in synchronism with the clock and a fourth latch 131b that temporally holds the parallel signals outputted out of the second serial/parallel converting circuit 133b and outputs them to the TBI section 122a of the ONU functioning section 120 in synchronism with the clock signal from the clock regenerating section 132b.

The serial/parallel converting section 130 also has loopback setting sections 136a and 136b. The loopback setting section 136a provided within the reverse serial/parallel converting section 130a can output the serial signals outputted out of the second latch 134a by selecting either one of the branching section 135a side and the loopback setting section 136b side based on a predetermined control signal inputted through a signal line 124a. The loopback setting section 136b provided within the serial/parallel converting section 130b can select either one of the signal outputted out of the synthesizing section 135b and the loopback setting section 136a and outputs the signal to the third latch 134b.

When the ONU 100 is enabled to communicate with the switch 70, the loopback setting section 136a is controlled so as to output the serial signals outputted out of the second latch 134a to the side of the branching section 135a to output the signals inputted from the ONU functioning section 120 to the switch 70 through the interface module 140. Still more, the loopback setting section 136b is controlled so as to output the signals outputted out of the synthesizing section 135b to the third latch 134b to output the signals from the switch 70 to the ONU functioning section 120 through the interface module 140.

However, when the loopback setting sections 136a and 136b are controlled to assume a loopback state based on a predetermined control signal inputted from the signal line 124a, the loopback setting section 136a is controlled so as to output the serial signals outputted out of the second latch 134a to the side of the loopback setting section 136b and the loopback setting section 136b is controlled so as to output the signals outputted out of the loopback setting section 136a to the third latch 134b. Thereby, the signals inputted from the ONU functioning section 120 are looped back again to the ONU functioning section 120 via the loopback setting sections 136a and 136b.

The communication between the OLT 11 and the ONU 100 must be enabled at first in order to enable the communication between the switch 70 connected to the ONU 100 and the center in the ONU 100 and the optical transmission system 1 constructed as shown in FIGS. 1 and 2. This communication enabled state is realized when the first MAC section 121 or the managing interface 123 confirms that a predetermined communication condition is established.

The first MAC section 121 or the managing interface 123 determines that the communication is enabled between the ONU 100 and the OLT 11 when either one communication condition is established, i.e., whether or not the PON link is established with the center or whether or not the authentication is established. It is determined that the PON link is established when an optical signal from the OLT 11 is detected and after that, when a predetermined signal exchange is carried out between the OLT 11 and the first MAC section 121 while meeting a predetermined condition. The establishment of the PON link corresponds to establishment of a link of a second layer in OSI (Open Systems Interconnection) reference model.

The authentication functioning section 12 in the center establishes the authentication after establishing the PON link between the OLT 11 and the ONU 100. The authentication functioning section 12 accesses to the ONU 100 to identify it, acquires data of an authentication mode held by the first MAC section 121 and authenticates the ONU 100 when the authentication functioning section 12 can identify the ONU 100 as a counterpart of the connection based on that. Then, the first MAC section 121 recognizes the authentication and informs of it to the managing interface 123.

When the communication between the OLT 11 and the ONU 100 is enabled, the ONU 100 outputs a predetermined signal, e.g., an idling signal or a frame of negotiation, to the switch 70 to inform that the ONU 100 is communicable. Receiving the predetermined signal from the ONU 100, the switch 70 starts a process for enabling to communicate with the ONU 100. That is, the switch 70 activates the function of auto-negotiation for example to set a communication standard, a communication mode and others to communicate with the ONU 100. When the setting of the communication standard, communication mode and other between the ONU 100 and the switch 70 is completed, the switch 70 is enabled to communicate with the center via the ONU 100.

If the ONU 100 outputs the signal, e.g., data and idling signal from the center or the frame of the negotiation, before the communication between the OLT 11 and the ONU 100 is enabled in the process of starting the communication described above, the switch 70 determines that the ONU 100 is communicable and outputs signals to the ONU 100. As a result, there is a possibility that the ONU 100 executes an error handling process, thus disabling to start the communication.

Still more, if the communication condition between the OLT 11 and the ONU 100 is disestablished by some reason after when the switch 70 is enabled to communicate with the OLT 11 of the center through the ONU 100, the transmission of signals between the ONU 100 and the switch 70 must be also quickly halted. If the ONU 100 continues to output signals (output such as the data and others from the center) to the switch 70 after when the communication of the ONU 100 is disabled, the switch 70 determines that the ONU 100 is communicable and continues to output normal signals to the ONU 100. As a result, there is a possibility that the ONU 100 executes the error handling process, thus disabling to restart the communication.

Then, the signal output control means 124 is provided in the ONU functioning section 120 to monitor the communication condition between the OLT 11 and the ONU 100 in the ONU 100 of the present embodiment.

That is, the signal output control means 124 is structured so that it receives information of the establishment of the PON link and of the authentication from the first MAC section 121 or the managing interface 123 and when it determines that neither of them is established, it outputs an output halting request to the loopback setting sections 136a and 136b provided in the serial/parallel converting section 130 via the signal line 124a.

Receiving the output halting request from the signal output control means 124, the loopback setting sections 136a and 136b are controlled to assume the loopback state. As a result, the signal line to the interface module 140 is opened due to the loopback setting section 136a. Thereby, no signal is outputted to the interface module 140 and to the switch 70. Because the switch 70 receives no signal from the ONU 100, it determines that the communication is disabled and halts to output signals to the ONU 100.

According to the ONU 100 of the present embodiment, the first MAC section 121 or the managing interface 123 monitors whether or not the communication condition with the OLT 11 is established and if they determine that the communication condition is not established, the signal output control means 124 outputs the output halting request to the loopback setting sections 136a and 136b to control them to assume the loopback state. Thereby, it becomes possible to halt the signals from being outputted to the switch 70 of the external node.

Figure 5:
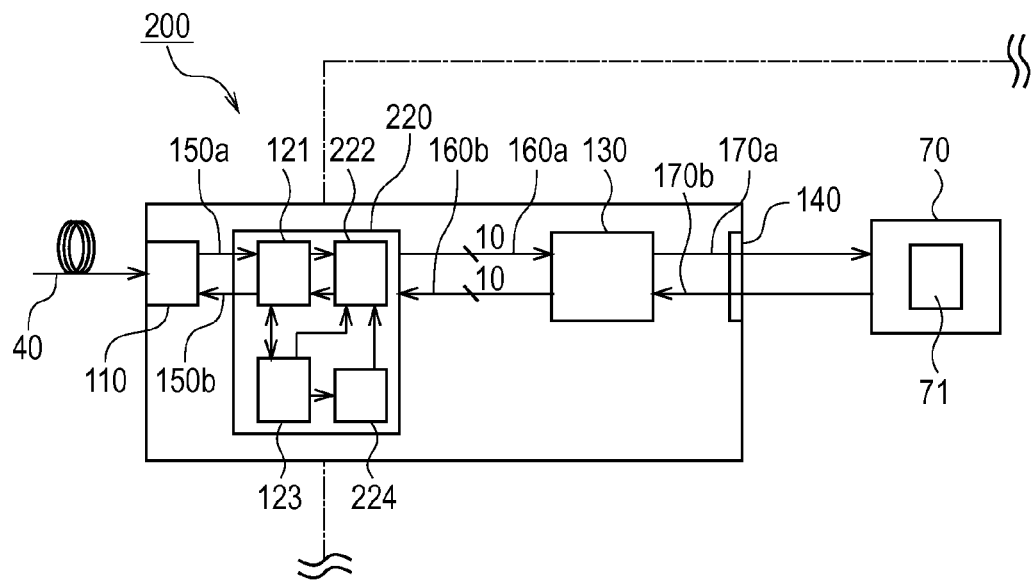
FIG. 5 is a block diagram showing a schematic structure of a subscriber premises side optical network unit according to another embodiment of the invention.

FIG. 5 is a block diagram showing a schematic structure of a subscriber premises side optical network unit according to another embodiment of the invention. An ONU 200 of the present embodiment is arranged so that a signal output control means 224 outputs the output halting request to a second MAC section 222. The second MAC section 222 is constructed to halt to output the down signal to the serial/parallel converting section 130 when it receives the output halting request from the signal output control means 224 and to output the signal normally when it receives no output halting request.

The first MAC section 121 or the managing interface 123 monitors whether or not the communication condition with the OLT 11 is established and when they determines that the condition is not established, they output the output halting request from the signal output control means 224 to halt to output the down signal from the second MAC section 222. Thus, it becomes possible to halt the signal from being outputted to the switch 70 through the serial/parallel converting section 130 and the interface module 140 also in the ONU 200 of the present embodiment.

Figure 6:
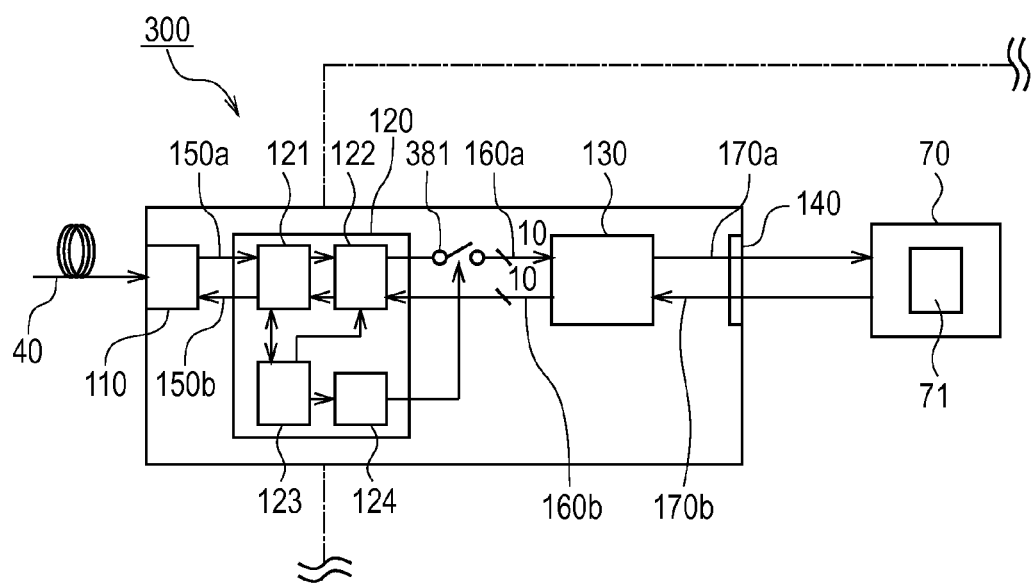
FIG. 6 is a block diagram showing a schematic structure of a subscriber premises side optical network unit according to a still other embodiment of the invention.

FIG. 6 is a block diagram showing a structure of a subscriber premises side optical network unit according to a different embodiment of the invention. An ONU 300 of this embodiment has a switch 381 on the way of the parallel transmission path 160a between the ONU functioning section 120 and the serial/parallel converting section 130 so as to receive the output halting request from the signal output control means 124. The switch 381 is controlled to be opened when it receives the output halting request from the signal output control means 124 and to be closed when it receives no output halting request.

The first MAC section 121 or the managing interface 123 monitors whether or not the communication condition with the OLT 11 is established and when they determines that the condition is not established, they output the output halting request from the signal output control means 124 to the switch 381 to control to be opened also in the ONU 300 of the present embodiment constructed as described above. Thereby, the transmission of the down signal from the ONU functioning section 120 to the serial/parallel converting section 130 is halted and the output of the signal from the interface module 140 to the switch 70 is halted.

Figure 7:
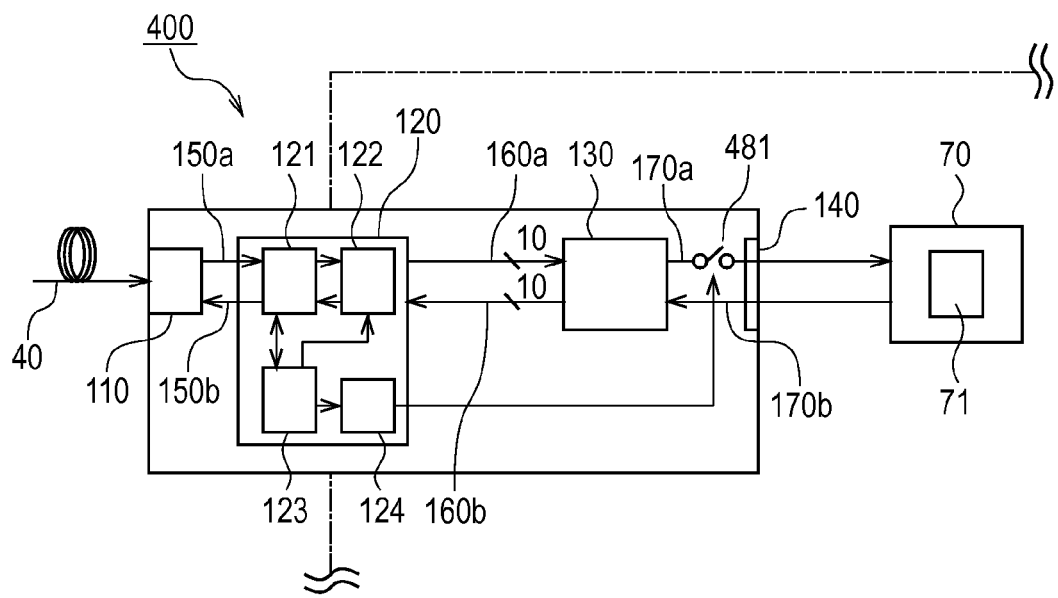
FIG. 7 is a block diagram showing a schematic structure of a subscriber premises side optical network unit according to a different embodiment of the invention.

FIG. 7 is a block diagram showing a structure of a subscriber premises side optical network unit according to a still other embodiment of the invention. An ONU 400 of this embodiment has a switch 481 on the way of the second serial transmission path 170a between the serial/parallel converting section 130 and the interface module 140 so as to receive the output halting request from the signal output control means 124. The switch 481 is controlled to be opened when it receives the output halting request from the signal output control means 124 and to be closed when it receives no output halting request.

The first MAC section 121 or the managing interface 123 monitors whether or not the communication condition with the OLT 11 is established and when they determine that the condition is not established, they output the output halting request from the signal output control means 124 to the switch 481 to control to be opened also in the ONU 400 of the present embodiment constructed as described above. Thereby, the transmission of the down signal from the serial/parallel converting section 130 to the interface module 140 is halted and the output of the signal to the switch 70 is halted.

Figure 8:
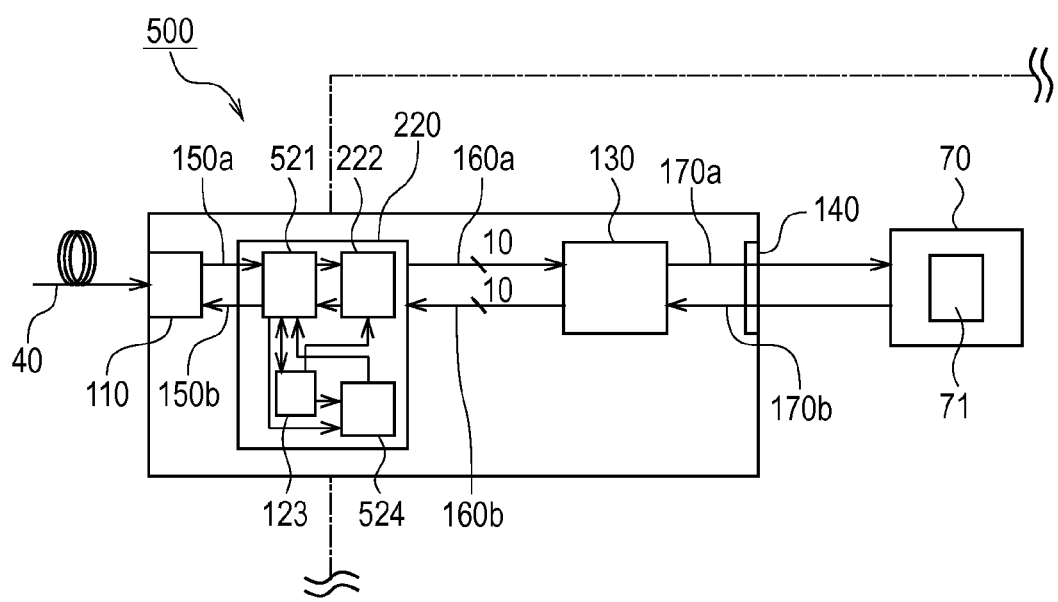
FIG. 8 is a block diagram showing a schematic structure of a subscriber premises side optical network unit according to a still different embodiment of the invention.
Figure 9:
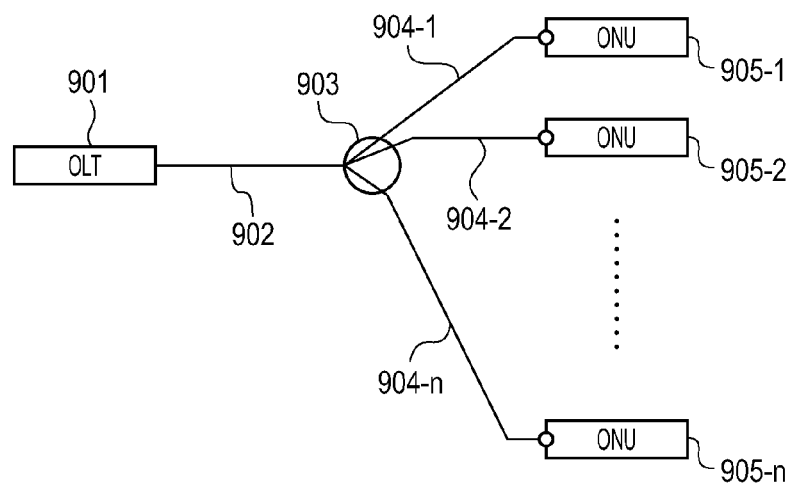
FIG. 9 is a structural diagram showing a prior art optical transmission system.
Figure 10:
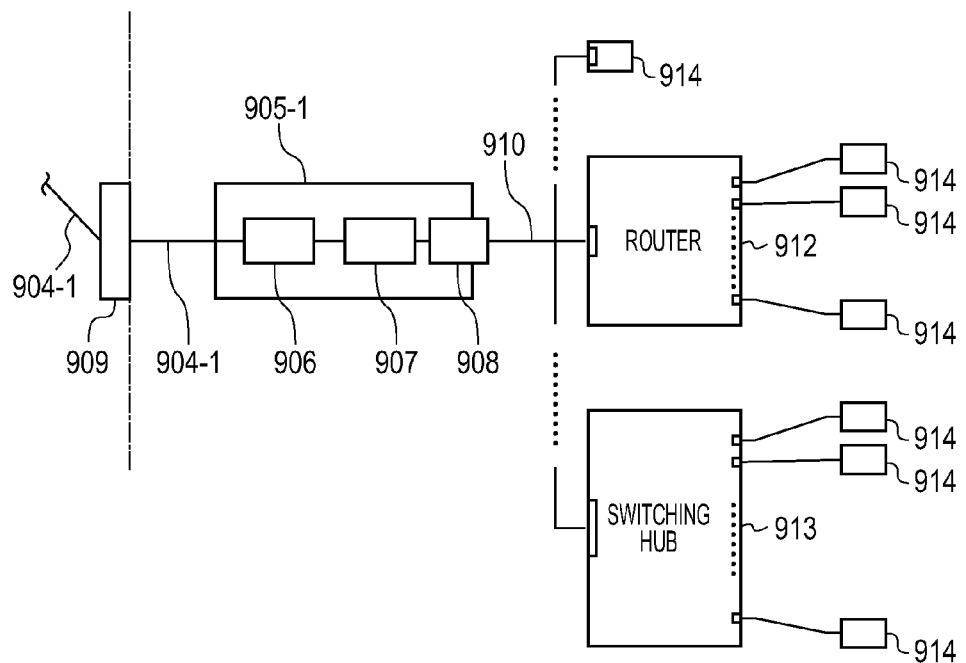
FIG. 10 is a block diagram showing a schematic structure of a subscriber premises side optical network unit of the prior art optical transmission system.

FIG. 8 is a block diagram showing a structure of a subscriber premises side optical network unit according to a still different embodiment of the invention. An ONU 500 of this embodiment is arranged such that a signal output control means 525 outputs the output halting request to a first MAC section 521. The first MAC section 521 is arranged such that it halts to output the down signal to the second MAC section 122 when it receives the output halting request from the signal output control means 524 and to output the signal normally when it receives no output halting request.

The first MAC section 521 or the managing interface 123 monitors whether or not the communication condition with the OLT 11 is established and when they determine that the condition is not established, they output the output halting request from the signal output control means 524 to halt the output of the down signal from the first MAC section 521. Thereby, it becomes possible to halt the output of the signal to the switch 70 through the serial/parallel converting section 130 and the interface module 140.

It is noted that although the embodiments using the multi-source agreement interface such as the GBI and SFP as the interface or interface module for connecting the ONU 100 with the external node have been explained above, the interface is not limited to those described above and it is possible to use an interface or interface module whose shape and interface signals are unique. For example, there is a case of setting the external node 70 shown in FIG. 1 as a base station having a unique interface and the ONU 100 connected to that has a unique interface connectable with the interface of the external node 70.

As described above, the effects of the invention explained by the abovementioned embodiments may be realized also in the case of using the unique interface or interface module other than the multi-source agreement interface.

It is noted that the description of the embodiments illustrate one exemplary subscriber premises side optical network unit and optical transmission system of the invention and the invention is not limited to them. The detailed structure, operations and others of the subscriber premises side optical network unit and optical transmission system of the embodiments may be modified appropriately within a scope of the invention described in the appended claims.

What is claimed is:

1. A subscriber premises side optical network unit, comprising:
   an electrical/optical converting means connected to a center side optical transmission path to carry out photoelectric conversion and reverse photoelectric conversion;
   an optical network unit functioning section connected to electrical signal input/output ends of the electrical/optical converting means;
   a serial/parallel converting means connected to parallel signal ends of the optical network unit functioning section to carry out serial/parallel conversion and reverse serial/parallel conversion; and
   a multi-source agreement interface module connected to serial signal ends of the serial/parallel converting means;
   wherein the optical network unit functioning section has a signal output control means that halts a down signal from being outputted from the multi-source agreement interface module to external nodes until when it determines that a communication condition with the center is established based on whether a passive optical network (PON) link with the center is established or authentication is established.

2. The subscriber premises side optical network unit according to claim 1, wherein the serial/parallel converting means has an output halting means for halting the down signal from being outputted to the multi-source agreement interface module in accordance to the predetermined output halting request; and
   the signal output control means outputs the output halting request to the output halting means until when it determines that the communication condition is established.

3. The subscriber premises side optical network unit according to claim 2, wherein the output halting means controls to assume a loopback state of returning the signal received from the optical network unit functioning section to the optical network unit functioning section when it receives the output halting request from the signal output control means and releases the loopback state when it receives no output halting request.

4. The subscriber premises side optical network unit according to claim 1, wherein the signal output control means halts to process the down signal in the optical network unit functioning section until when it determines that the communication condition is established.

5. The subscriber premises side optical network unit according to claim 1, wherein the multi-source agreement interface module is either gigabit interface connector (GBIC) or small form-factor pluggable (SFP) module.

6. The subscriber premises side optical network unit according to claim 1, wherein both input and output signals of parallel signals transmitted between the optical network unit functioning section and the serial/parallel converting means are composed of 10 bits.

7. An optical transmission system, comprising:
   the subscriber premises side optical network unit as described in claim 1,
   an optical multiplexing/branching section having subscriber premises side ports connected to the subscriber premises side optical network unit through first optical transmission paths;
   a second optical transmission paths connected to center side ports of the optical multiplexing/branching section; and
   a center side optical line termination connected to the second optical transmission paths.

8. The optical transmission system according to claim 7, wherein the multi-source agreement interface module of the subscriber premises side optical network unit is directly connected to a multi-source agreement interface slot of the external node.

9. The optical transmission system according to claim 8, wherein the external node is a switch having a plurality of ports.

10. A subscriber premises side optical network unit, comprising:
    an electrical/optical converting means connected to a center side optical transmission path to carry out photoelectric conversion and reverse photoelectric conversion;
    an optical network unit functioning section connected to electrical signal input/output ends of the electrical/optical converting means;
    a serial/parallel converting means connected to parallel signal ends of the optical network unit functioning section to carry out serial/parallel conversion and reverse serial/parallel conversion; and
    an interface module connected to serial signal ends of the serial/parallel converting means;
    wherein the optical network unit functioning section has a signal output control means that halts a down signal from being outputted from the interface module to the external nodes until when it determines that a communication condition with the center is established based on whether a passive optical network (PON) link with the center is established or authentication is established.

11. The subscriber premises side optical network unit according to claim 10, wherein the serial/parallel converting means has an output halting means for halting the down signal from being outputted to the interface module in accordance to the predetermined output halting request and the signal output control means outputs the output halting request to the output halting means until when it determines that the communication condition is established.

12. The subscriber premises side optical network unit according to claim 11, wherein the output halting means controls to assume a loopback state of returning the signal received from the optical network unit functioning section to the optical network unit functioning section when it receives the output halting request from the signal output control means and releases the loopback state when it receives no output halting request.

13. The subscriber premises side optical network unit according to claim 10, wherein the signal output control means halts to process the down signal in the optical network unit functioning section until when it determines that the communication condition is established.

14. The subscriber premises side optical network unit according to claim 10, wherein both input and output signals of parallel signals transmitted between the optical network unit functioning section and the serial/parallel converting means are composed of 10 bits.

15. An optical transmission system, comprising:
- the subscriber premises side optical network unit as described in claim 10;
- an optical multiplexing/branching section having subscriber premises side ports connected to the subscriber premises side optical network unit through first optical transmission paths;
- a second optical transmission paths connected to center side ports of the optical multiplexing/branching section; and
- a center side optical line termination connected to the second optical transmission paths.

16. The optical transmission system according to claim 15, wherein the interface module of the subscriber premises side optical network unit is directly connected to an interface slot of the external node.

17. The optical transmission system according to claim 16, wherein the external node is a switch having a plurality of ports.

* * * * *